United States Patent
Szczeszynski

(10) Patent No.: US 11,923,765 B2
(45) Date of Patent: Mar. 5, 2024

(54) MULTI-LEVEL POWER CONVERTERS HAVING A TOP AND BOTTOM HIGH-VOLTAGE PROTECTIVE SWITCHES

(71) Applicant: pSemi Corporation, San Diego, CA (US)

(72) Inventor: Gregory Szczeszynski, Hollis, NH (US)

(73) Assignee: pSemi Corporation, San Diego, CA (US)

( * ) Notice: Subject to any disclaimer, the term of this patent is extended or adjusted under 35 U.S.C. 154(b) by 44 days.

(21) Appl. No.: 17/560,700

(22) Filed: Dec. 23, 2021

(65) Prior Publication Data
US 2023/0136027 A1 May 4, 2023

Related U.S. Application Data

(60) Provisional application No. 63/274,251, filed on Nov. 1, 2021.

(51) Int. Cl.
*H02M 3/158* (2006.01)
*H02M 1/32* (2007.01)
*H02M 3/07* (2006.01)

(52) U.S. Cl.
CPC .......... *H02M 1/325* (2021.05); *H02M 3/158* (2013.01); *H02M 3/07* (2013.01)

(58) Field of Classification Search
CPC .................. H02M 3/158; H02M 3/07–073
See application file for complete search history.

(56) References Cited

U.S. PATENT DOCUMENTS

| 4,257,087 A | 3/1981 | Cuk |
| 4,654,769 A | 3/1987 | Middlebrook |

(Continued)

FOREIGN PATENT DOCUMENTS

| CN | 110545040 | 12/2019 |
| CN | 110545040 A | * 12/2019 |

(Continued)

OTHER PUBLICATIONS

English translation of Wang, "CN110545040A" Three-level Buck circuit and control method thereof (Year: 2019).*

(Continued)

*Primary Examiner* — Sisay G Tiku
(74) *Attorney, Agent, or Firm* — JAQUEZ LAND GREENHAUS & McFARLAND LLP; John Land, Esq.

(57) ABSTRACT

Circuits and methods for protecting a multi-level power converter using no more than two high-voltage FET switches while allowing all or most other power switches to be low-voltage FET switches. Some embodiments provide protective high-voltage top and bottom FETs designed to saturate before the remaining low-power FET switches saturate. Other embodiments may use only low-power FETs for the power switches but provide protective circuits configured to be in an always-ON (conducting) state when in normal power conversion operation, and to quickly switch to an OFF (non-conducting) state in the event of transients or a fault condition. Optionally, one or more of the protective circuits may be used in a controlled manner to limit or block current flow during certain types of fault conditions and/or to limit in-rush current during startup of a power converter.

11 Claims, 9 Drawing Sheets

(56) References Cited

U.S. PATENT DOCUMENTS

| | | |
|---|---|---|
| 4,720,668 A | 1/1988 | Lee |
| 5,969,484 A | 10/1999 | Santi |
| 6,294,900 B1 | 9/2001 | Greenwood |
| 6,304,460 B1 | 10/2001 | Cuk |
| 8,159,200 B2 | 4/2012 | Lesso |
| 9,160,232 B2 | 10/2015 | Thomas et al. |
| 9,337,732 B2 | 5/2016 | Kondou |
| 9,571,006 B2 | 2/2017 | Stahl et al. |
| 9,641,071 B2 | 5/2017 | Logiudice |
| 9,748,841 B2 | 8/2017 | Granato |
| 9,899,918 B2 | 2/2018 | Lee |
| 10,090,763 B1 | 10/2018 | Mercer |
| 10,547,241 B1 | 1/2020 | Li |
| 10,686,367 B1 | 6/2020 | Low |
| 10,720,842 B1 | 7/2020 | Wu et al. |
| 10,720,843 B1 | 7/2020 | Wu et al. |
| 10,770,974 B2 | 9/2020 | Wu et al. |
| 10,992,226 B1 | 4/2021 | Aboueldahab et al. |
| 11,646,665 B2 | 5/2023 | Wu |
| 2006/0087295 A1 | 4/2006 | Jang |
| 2009/0001955 A1 | 1/2009 | Yoshida |
| 2009/0059630 A1 | 3/2009 | Williams |
| 2009/0189393 A1 | 7/2009 | Tyagi |
| 2010/0052050 A1 | 3/2010 | Lofti et al. |
| 2010/0259240 A1 | 10/2010 | Cuk |
| 2011/0057640 A1 | 3/2011 | Cuk |
| 2012/0194164 A1 | 8/2012 | Ligiudice |
| 2012/0262967 A1 | 10/2012 | Cuk |
| 2012/0268969 A1 | 10/2012 | Cuk |
| 2013/0088211 A1 | 4/2013 | Radtke |
| 2014/0232364 A1* | 8/2014 | Thomas .............. H02M 7/4833 323/271 |
| 2015/0003127 A1* | 1/2015 | Takizawa .............. H02M 7/483 363/123 |
| 2015/0230302 A1 | 8/2015 | Ito |
| 2016/0118817 A1 | 4/2016 | Uno |
| 2016/0197552 A1 | 7/2016 | Giuliano |
| 2018/0026518 A1 | 1/2018 | Liu |
| 2018/0062507 A1 | 3/2018 | Giuliano |
| 2018/0123341 A1 | 5/2018 | Lehn |
| 2018/0131281 A1 | 5/2018 | Inoue |
| 2019/0109530 A1 | 4/2019 | Perreault |
| 2019/0115830 A1 | 4/2019 | Giuliano |
| 2019/0199221 A1 | 6/2019 | Zhao |
| 2020/0228016 A1 | 7/2020 | Wu |
| 2020/0243744 A1 | 7/2020 | Chaput |
| 2021/0367430 A1 | 11/2021 | Da Silva |
| 2022/0190712 A1 | 6/2022 | Chen et al. |
| 2022/0190738 A1 | 6/2022 | Chen |
| 2022/0321010 A1 | 10/2022 | Bieber |
| 2022/0416653 A1 | 12/2022 | Giuliano |
| 2022/0416664 A1 | 12/2022 | Wu et al. |
| 2023/0136027 A1 | 5/2023 | Szczeszynski et al. |
| 2023/0142335 A1 | 5/2023 | Szczeszynski et al. |
| 2023/0148059 A1 | 5/2023 | Szczeszynski et al. |

FOREIGN PATENT DOCUMENTS

| | | | |
|---|---|---|---|
| CN | 111697821 A * | 9/2020 | .............. H02M 3/07 |
| WO | 2023/081610 | 5/2023 | |

OTHER PUBLICATIONS

Szczeszynski, Gregory, "Controlling Charge-Balance and Transients in a Multi-Level Power Converter:", patent application filed in the USPTO on Dec. 23, 2021, U.S. Appl. No. 17/560,767, 78 pgs.

Szczeszynski, Gregory, "Improving Light-Load Recovery in a Multi-Level Converter", patent application filed in the USPTO on Dec. 23, 2021, U.S. Appl. No. 17/560,683, 52 pgs.

Zweizig, Jefferey Shawn, Office Action received from the USPTO dated Oct. 14, 2022 for U.S. Appl. No. 17/559,931, 11 pgs.).

Wu, Gary, "Efficient Bootstrap Supply Generators for Multi-Level Power Converters", U.S. Patent application filed in the USPTO on Dec. 22, 2021 for U.S. Appl. No. 17/559,931, 67 pgs.

Madouroglou, E., International Search Report and Written Opinion received from the EPO dated Sep. 19, 2022, 14 pgs.

Meynard, et al., "Multi-Level Conversion: High Voltage Choppers and Voltage-Source Inverters", Proceedings of the Annual Power Electronics Specialists Conference, Toledo, Jun. 29-Jul. 3, 1992; Proceedings of the Annual Power Electronics Specialists Conference, New York, IEEE, US, vol. 1, Jun. 29, 1992, pp. 397-403.

Peng, Fang Zheng, "A Generalized Multilevel Inverter Topology with Self Voltage Balancing", IEEE Transactions on Industry Applications, IEEE Service Center, vol. 37, No. 2, Mar. 1, 2001, pp. 611-618.

Chen, et al., "Zero-Voltage-Switching PWM Hybrid Full-Bridge Three-Level Converter", IEEE Transactions on Power Electronics, Institute of Electrical and Electronics Engineers, vol. 20, No. 2, Mar. 1, 2005, pp. 395-404.

Lin, et al., "Interleaved Resonant Converter with the Balanced Flying Capacitors", IET Power Electronics, IET, UK, vol. 8, No. 3, Mar. 1, 2015, pp. 447-457.

Zweizig, Jefferey Shawn, Notice of Allowance received from the USPTO dated Dec. 28, 2022 for U.S. Appl. No. 17/559,931, 7 pgs.).

Giuliano, David, "Multi-Level Structures and Methods for Switched-Mode Power Supplies", patent application filed in the USPTO on Dec. 22, 2021, U.S. Appl. No. 17/559,945, 74 pgs.

Ahmed, Yusef A., Office Action received from the USPTO dated Feb. 1, 2023 for U.S. Appl. No. 17/559,945, 19 pgs.

Kellner, Alexandria, International Search Report and Written Opinion received from the EPO dated Feb. 2, 2023 for appln. No. PCT/US2022-078717, 12 pgs.

Da Rocha, et al., "Level Shifters and DCVSL for a Low-Voltage CMOS 4.2-V Buck Converter", IEEE Transactions on Industrial Electronics, vol. 55, No. 9, Sep. 2008, pp. 3315-3323.

Kruip, Stephan, International Search Report and Written Opinion received from the EPO dated Feb. 27, 2023 for appln. No. PCT/US2022/078918, 9 pgs.

Sepahvand, et al., "Start-up Procedure and Switching Loss Reduction for a Single-Phase Flying Capacitor Active Rectifier", IEEE Transactions on Industrial Electronics, vol. 60, No. 9, Sep. 2013, pp. 3699-3710.

Kruip, Stephan, International Search Report and Written Opinion received from the EPO dated Feb. 28, 2023 for appln. No. PCT/US2022/078920, 10 pgs.

Yuan, et al., "Self-Balancing of the Clamping-Capacitor-Voltages in the Multilevel Capacitor-Clamping-Inverter under Sub-Harmonic PWM Modulation", IEEE Transactions on Power Electronics, vol. 16, No. 2, Mar. 2001, pp. 256-263.

Jia, et al., "Active Power Decoupling for a Modified Modular Multilevel Converter to Decrease Submodule Capacitor Voltage Ripples and Power Losses", IEEE Transactions on Power Electronics, vol. 36, No. 3, Mar. 2021, pp. 2835-2851.

Zou, et al., The Analysis of DC-DC Converter Topologies Based on Stackable Voltage Elements, The Ohio State University, IEEE 2010, pp. 4428-4433.

Novak, Peter Michael, Final Office Action received from the USPTO dated Jan. 22, 2024 for U.S. Appl. No. 17/560,683, 22 pgs.

* cited by examiner

MULTI-LEVEL POWER CONVERTERS HAVING A TOP AND BOTTOM HIGH-VOLTAGE PROTECTIVE SWITCHES

CROSS-REFERENCE TO RELATED APPLICATIONS—CLAIM OF PRIORITY

The present application claims priority to U.S. provisional Patent Application No. 63/274,251, filed on Nov. 1, 2021, for a "Protecting Multi-Level Power Converters", which is herein incorporated by reference in its entirety.

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as a battery, solar cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than Vv. Some power converters may be either a buck converter or a boost converter depending on which terminals are used for input and output. Some power converters may provide an inverted output.

Various types of power converter comprise a converter circuit, control circuitry, and auxiliary circuitry such as bias voltage generator(s), a clock generator, a voltage regulator, a voltage control circuit, etc. For example, FIG. 1 is a block diagram of a prior art power converter 100. A converter circuit 102 having input terminals T1/T1' and output terminals T2/T2' is configured such that input terminals T1/T1' are coupled to a voltage source 104 (e.g., a battery) and output terminals T2/T2' are coupled to an output capacitor $C_{OUT}$ and a load 106 (which also may be represented as an equivalent resistance R).

In the illustrated example, the voltage applied across input terminals T1/T1' is $V_{IN}$, and the converted voltage provided across output terminals T2/T2' is $V_{OUT}$. A controller 108 outputs a set of control-signals 112 that control the internal components of the converter circuit 102 (e.g., internal switches, such as FETs, especially MOSFETs) to cause the converter circuit 102 to either boost or buck $V_{IN}$ to $V_{OUT}$. The controller 108 may also receive a separate set of control signals 112 indicative of the converter circuit 102 operational status. An auxiliary circuit 110 may provide various voltages and/or signals to the controller 108 (and optionally directly to the converter circuit 102), such as a voltage $V_{DD}$, a clock signal CLK, a circuit bias voltage $V_{BI}As$, and one or more control signals CTRL. Power to the illustrated auxiliary circuit 110 is supplied at terminal $V_{INPUT}$, and may come from the illustrated voltage source 104 or from another source (including the converter circuit 102 when fully operational).

The converter circuit 102 may be, for example, a switched-capacitor network such as a charge pump, or an inductor-based regulator. Multi-level converters typically combine a charge-pump capacitive voltage converter with an inductor-based power converter in one structure, allowing lower voltage power switches to be used. In many designs, the converter circuit 102 uses capacitors as energy storage elements to transfer charge from the input to the output of the power converter 100. These charge transfer capacitors are commonly known as "fly capacitors" or "pump capacitors" and may be external components coupled to an integrated circuit embodiment of the power converter 100. In some designs, the converter circuit 102 also uses an inductor as an energy storage element.

A general problem with many FET-based power converter architectures is that excessive current in-rush needs to be avoided during startup of the power converter. In integrated circuit implementations, parasitic inductances exist (for example, due to on-die conductor routing and printed circuit board conductor routing). While the parasitic inductances increase the total impedance in the circuit and thus help reduce the maximum current, the parasitic inductances also store energy which extends how long a current surge is present and can result in ringing if there is capacitance present (which is the case in such circuits). Such ringing can cause voltage spikes that are significantly higher than $V_{IN}$ and electrically overstress the charge pump power switches, affecting their reliability, potentially to destruction. In addition, voltage spikes higher than $V_{IN}$ due to rapidly changing current flow may occur in other cases, such as when the electrical charge among the fly capacitors is out of balance or when the output of the converter circuit is shorted.

A conventional solution to the problem of voltage spikes is to require that all of the FET power switches in a multilevel power converter be high-voltage devices (e.g., having a breakdown voltage $BV_{DS}$ of equal to or higher than the maximum designed $V_{IN}$). A drawback of such high-voltage devices is that they consume more die area—which generally means higher cost—and are generally less efficient than lower voltage breakdown FETs.

It would be desirable protect a multi-level power converter using no more than two high-voltage FET switches while allowing all or most other switches to be low-voltage FET switches. The present invention addresses this need.

SUMMARY

The present invention encompasses circuits and methods for protecting a multi-level power converter using no more than two high-voltage FET switches while allowing all or most other power switches to be low-voltage FET switches. Some embodiments provide protective high-voltage top and bottom FETs designed to saturate before the remaining low-power FET switches $Sw_X$ saturate. Other embodiments may use only low-power FETs for the power switches $Sw_X$ but provide protective circuits configured to be in an always-ON (conducting) state when in normal power conversion operation, and to quickly switch to an OFF (non-conducting) state in the event of transients or a fault condition. Optionally, one or more of the protective circuits may be used in a controlled manner to limit or block current flow during certain types of fault conditions and/or to limit in-rush current during startup of a power converter.

Embodiments include a multi-level power converter based on field-effect transistors (FET), including: a first protective FET switch configured to be coupled to an input voltage source, the first protective FET switch having a first breakdown voltage characteristic and a first saturation current characteristic; a second protective FET switch configured to be coupled to a reference voltage (e.g., circuit ground), the second protective FET switch having a second breakdown voltage characteristic and a second saturation current characteristic; and a set of one or more intermediate series-coupled FET switches, the set being series-coupled between the first protective FET switch and the second protective FET switch, wherein one or more of the FET switches in the set have a breakdown voltage characteristic that is less than the first breakdown voltage characteristic and the second breakdown voltage characteristic, and have a saturation current characteristic that is greater than the first saturation current characteristic and the second saturation current characteristic.

Other embodiments include a multi-level power converter, including a first protective switch configured to be coupled to an input voltage source and having a control input for setting the first protective switch to an open state or to a closed state; a second protective switch configured to be coupled to a reference voltage (e.g., circuit ground) and having a control input for setting the first protective switch to an open state or to a closed state; and a set of one or more series-coupled field-effect transistors (FET) switches, the set being series-coupled between the first protective switch and the second protective switch; wherein the first protective switch and the second protective switch are set to the closed state during normal operation of the multi-level power converter, and at least one of the first protective switch and the second protective switch is set to the open state in response to one or more transient events or fault events.

Still other embodiments include a multi-level power converter based on field-effect transistors (FET), including a first FET protective switch configured to be coupled to an input voltage source and having a control input for setting the first FET protective switch to an open state or to a closed state; a second FET protective switch configured to be coupled to a reference voltage (e.g., circuit ground) and having a control input for setting the second FET protective switch to an open state or to a closed state; and a set of one or more series-coupled FET power switches, the set being series-coupled between the first FET protective switch and the second FET protective switch; wherein the first FET protective switch and the second FET protective switch are set to the closed state during normal operation of the multi-level power converter, and wherein at least one of the first FET protective switch and the second FET protective switch is set to the open state in response to one or more transient events or fault events.

Yet other embodiments include a multi-level power converter based on field-effect transistors (FET), including a set of one or more series-coupled FET power switches, the set including a first FET power switch configured to be coupled to an input voltage source and a last FET power switch configured to be coupled to a reference voltage (e.g., circuit ground); a first FET protective switch having a control input for setting the first FET protective switch to an open state or to a closed state, the first FET protective switch coupled between the first FET power switch and a next FET power switch in the set of one or more series-coupled FET power switches; and a second FET protective switch configured to be coupled to a reference voltage (e.g., circuit ground) and having a control input for setting the second FET protective switch to an open state or to a closed state, the second FET protective switch coupled between the last FET power switch and a preceding FET power switch in the set of one or more series-coupled FET power switches; wherein the first FET protective switch and the second FET protective switch are set to the closed state during normal operation of the multi-level power converter, and wherein at least one of the first FET protective switch and the second FET protective switch is set to the open state in response to one or more transient events or fault events.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods for protecting a multi-level power converter using no more than two high-voltage FET switches while allowing all or most other power switches to be low-voltage FET switches. Some embodiments provide protective high-voltage top and bottom FETs designed to saturate before the remaining low-power FET switches $Sw_X$ saturate. Other embodiments may use only low-power FETs for the power switches $Sw_X$ but provide protective circuits configured to be in an always-ON (conducting) state when in normal power conversion operation, and to quickly switch to an OFF (non-conducting) state in the event of transients or a fault condition. Optionally, one or more of the protective circuits may be used in a controlled manner to limit or block current flow during certain types of fault conditions and/or to limit in-rush current during startup of a power converter.

General Approach

Figure 1:
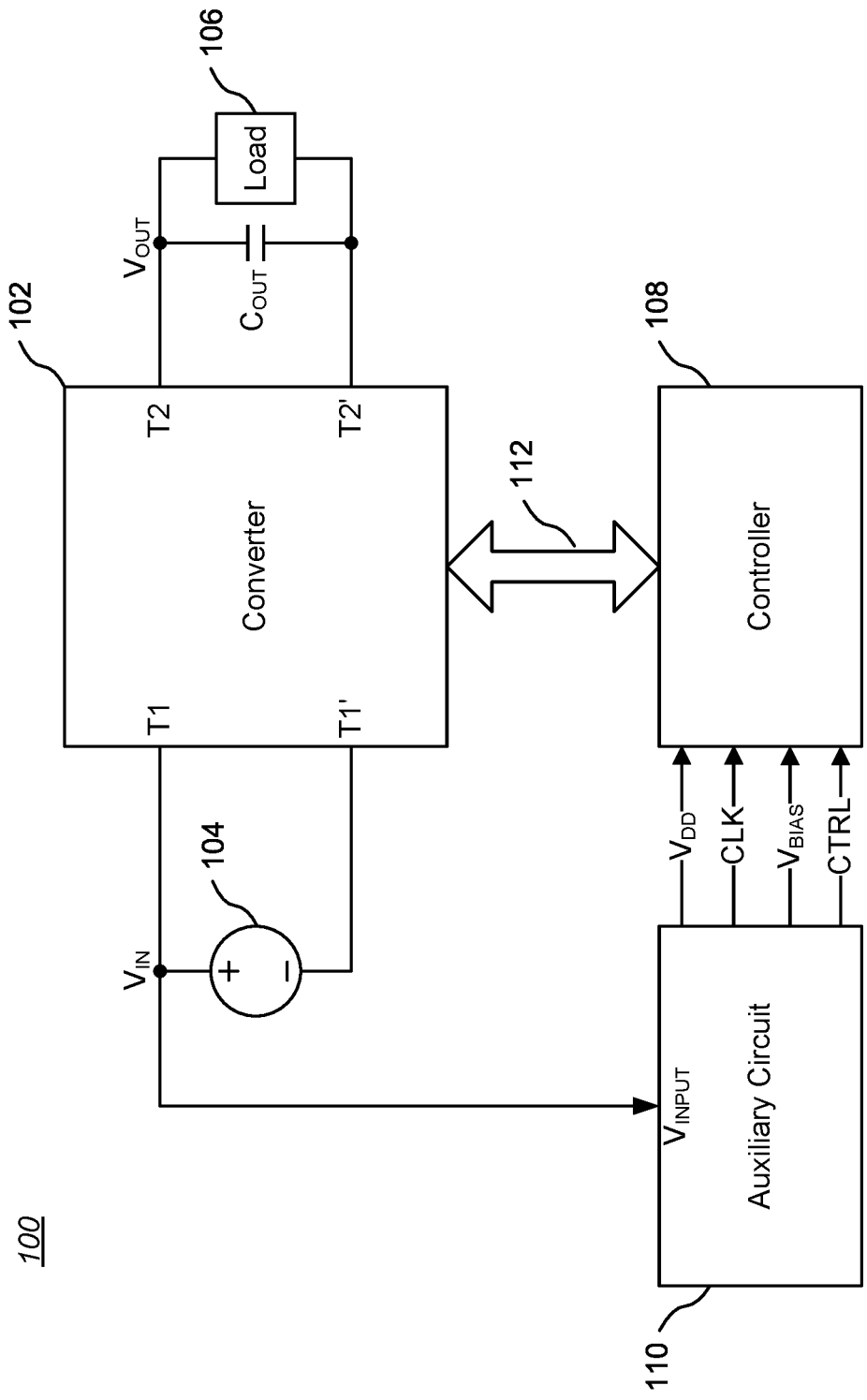
FIG. 1 is a block diagram of a prior art power converter.
Figure 2:
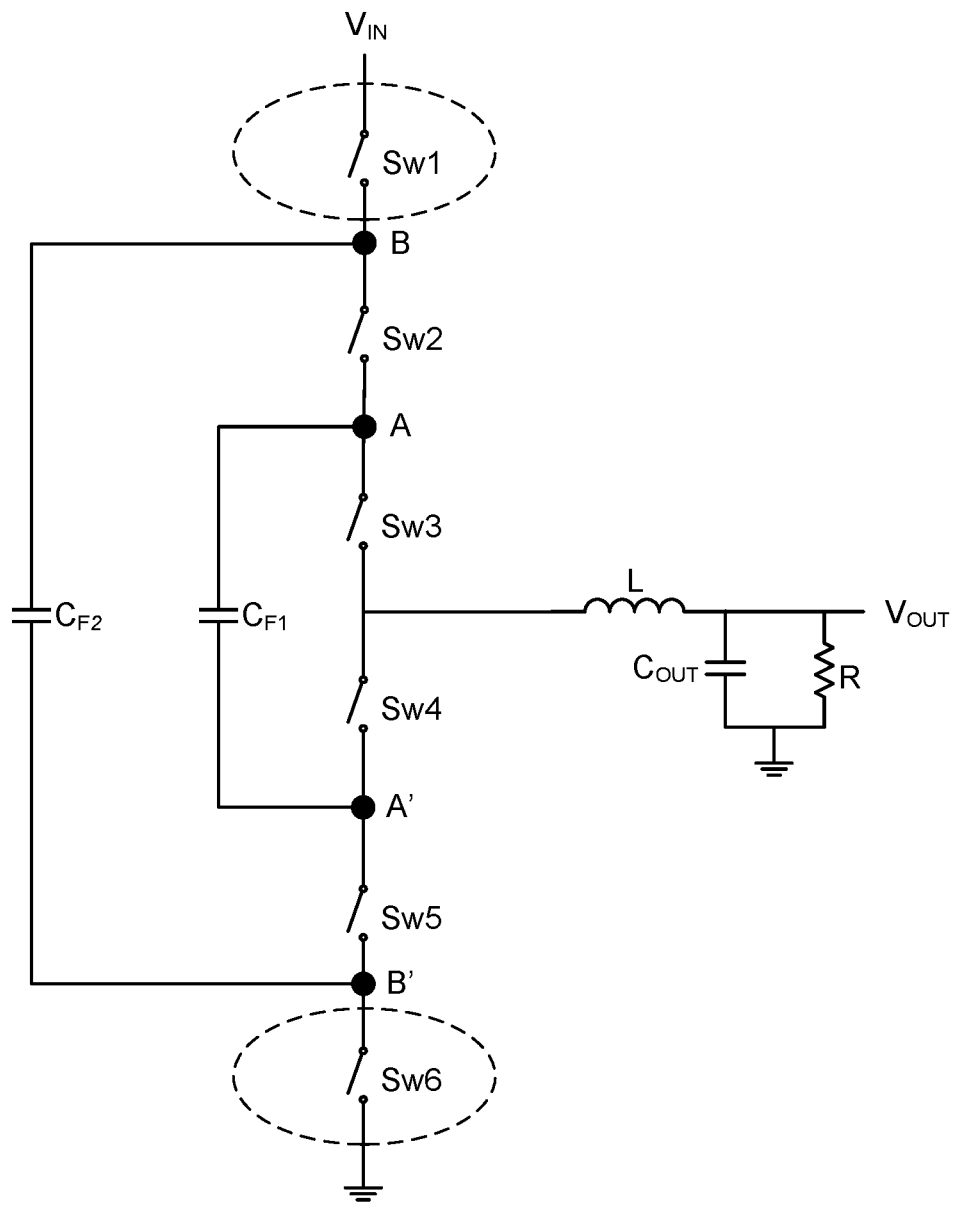
FIG. 2 is a schematic diagram of one type of prior art multi-level converter circuit that may be used as the converter circuit of FIG. 1.

FIG. 2 is a schematic diagram of one type of prior art multi-level converter circuit 200 that may be used as the converter circuit of FIG. 1. In the illustrated example, which is a 4-level multi-level DC-to-DC converter, the converter circuit 200 switches between multiple states, each of which defines one of several different voltages presented to an inductor L coupled to an output capacitor $C_{OUT}$ and a load resistance R. The illustrated multi-level DC-to-DC converter may be configured as a buck only converter, as a boost only converter, or as a buck-boost converter, and may be inverting or non-inverting.

In greater detail, the multi-level converter 200 converts an input voltage $V_{IN}$ to an output voltage $V_{OUT}$ by actively switching two or more series-connected power switches (generally MOSFETs). The state transition patterns of the power switches determine operational zones and corresponding $V_{OUT}$ ranges. In the example of FIG. 2, the multi-level converter circuit 200 includes an inductor L bracketed by two sets of series-connected power switches, Sw1-Sw3 and Sw4-Sw6 (generically, $Sw_X$). Each pair of power switches in the first and second sets of series-coupled power switches is separated by a respective node. The node between each pair of power switches in one set is coupled by a fly capacitor $C_{FX}$ to the corresponding node between each pair of power switches in the other set. For example, in FIG. 2, node A between power switches Sw2 and Sw3 is coupled by fly capacitor $C_{F1}$ to node A' between power switches Sw4 and Sw5; similarly, node B between power switches Sw1 and Sw2 is coupled by fly capacitor $C_{F2}$ to node B' between power switches Sw5 and Sw6. Controlling clock signals for each set of power switches during normal conversion operation are generally non-overlapping and complementary, and are provided by a control circuit (e.g., the controller 108 of FIG. 1).

The power switches (such as power switches Sw1-Sw6 in FIG. 2) in modern power converters (particularly multi-level power converters) are often implemented with FETs, especially MOSFETs. It generally would be advantageous to allow the use of low-voltage FETs (e.g., having a breakdown voltage $BV_{DS}$ substantially lower then $V_{IN}$) wherever possible as consuming less integrated circuit die area and generally being more efficient than higher breakdown FETs. A disadvantage of using low-voltage FETs is that they require protection from damage during stress conditions, particular from voltages that exceed the breakdown voltage of such FETs.

For example, as mentioned above, a general problem with many FET-based power converter architectures is that excessive current in-rush needs to be avoided during startup of the power converter. For instance, absent sufficient guard circuitry, when $V_{IN}$ is first applied to a power converter of the type shown in FIG. 1, none of the fly capacitors $C_{FX}$ would be initially charged and accordingly current may rush into the circuit. For example, if the total sum of the $R_{ON}$ values of the FET power switches is 10 milliohms (0.01 ohms), and $V_{IN}$ is 10V, then as a result of Ohm's law, V=I×R, the in-rush current will be a spike of about 1,000 amps. In integrated circuit implementations, parasitic inductances exist (for example, due to on-die conductor routing and printed circuit board conductor routing). While the parasitic inductances increase the total impedance in the circuit and thus help reduce the maximum current, the parasitic inductances also store energy which extends how long the current surge is present and can result in ringing if there is capacitance present (which is the case in such circuits). Such ringing can cause voltage spikes that are significantly higher than $V_{IN}$ and electrically overstress the charge pump power switches, affecting their reliability, potentially to destruction. In addition, voltage spikes higher than $V_{IN}$ due to rapidly changing current flow may occur in other cases, such as when the electrical charge among the fly capacitors $C_{FX}$ is out of balance or when the output of the converter circuit is shorted.

In multi-level power converters like the circuit shown in FIG. 2, the fly capacitors $C_FX$ at times are referenced to the $V_{IN}$ supply and at times are referenced to ground. During stable operation, the FET switches bracketed by (i.e., in parallel with) the fly capacitors $C_{FX}$ see less voltage across them due to the voltage stabilizing effects of the fly capacitors $C_FX$. However, during certain transients or fault conditions, the fly capacitors $C_{FX}$ may no longer hold off the voltage sufficiently to avoid damage to the FET switches. For example, during and/or after a large input supply increase (such as when changing from one power source to another power source having more or less voltage), the fly capacitors $C_{FX}$ need time to the re-balance their voltages with respect to each other and with respect to $C_{OUT}$; until re-balancing occurs, low-voltage FETs may be stressed. As another example, during an output short condition, resulting high current spikes may overstress the FET switches despite the presence of the fly capacitors $C_FX$. Moreover, the "top" and "bottom" FET switches Sw1 and Sw6 (shown encircled by dotted lines in FIG. 2) have no bracketing protective fly capacitor.

It was realized that, in contrast to conventional solutions requiring high-voltage FETs for all power switches, low-voltage FETs could be used for most or all of the power switches $Sw_X$ in a multi-level power converter if current surges induced by sudden voltage changes could be controlled, particularly in light of the voltage stabilizing effects of the fly capacitors $C_{FX}$ during normal converter operation. This insight led to several solutions described below.

First Embodiment

Figure 3:
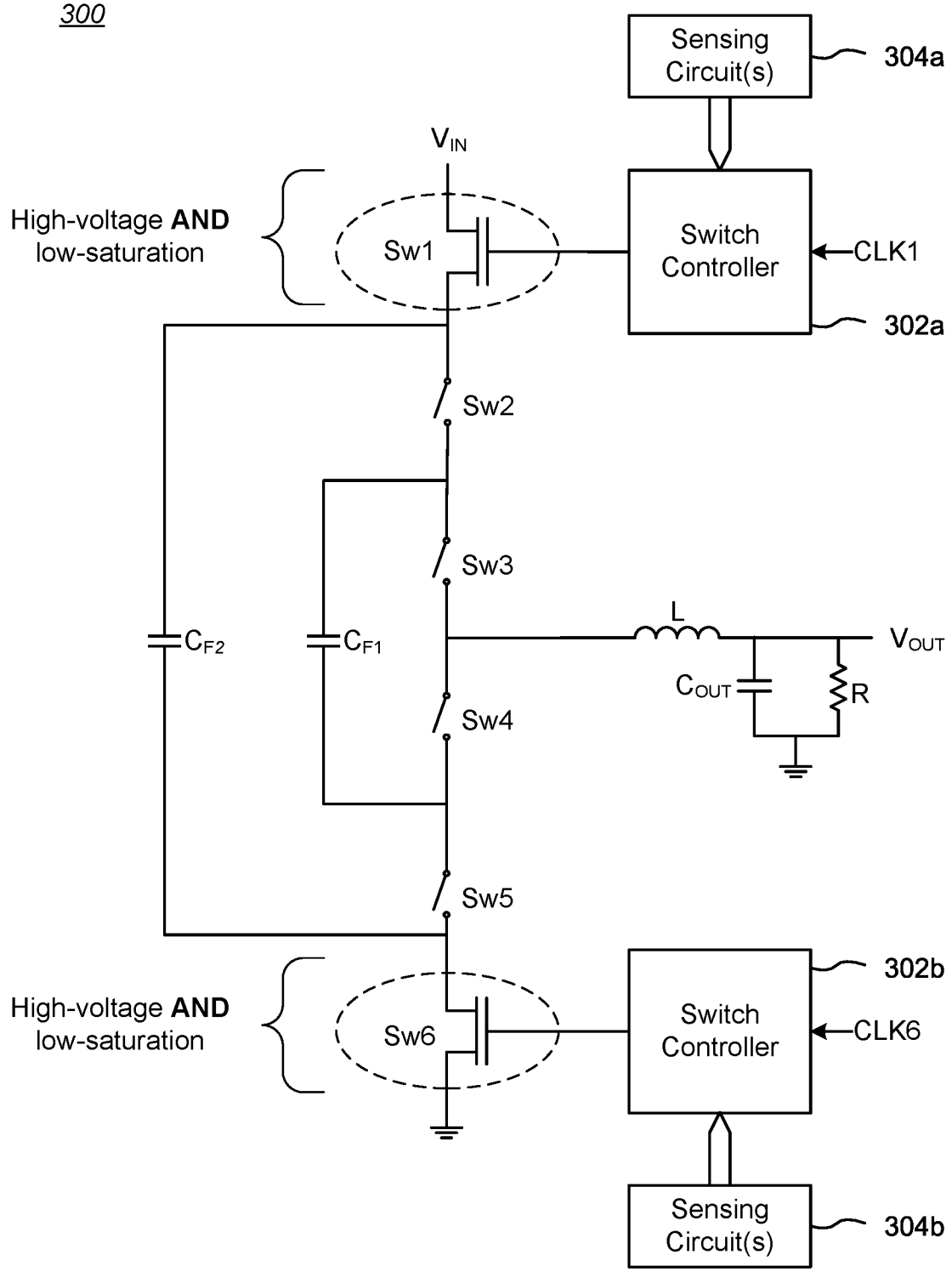
FIG. 3 is a block diagram of a first embodiment of a multi-level converter circuit with protection circuitry in accordance with the present invention.

FIG. 3 is a block diagram of a first embodiment 300 of a multi-level converter circuit with protection circuitry in accordance with the present invention. The illustrated multi-level converter circuit is a 4-level multi-level DC-to-DC converter similar in many aspects to the multi-level converter circuit 200 of FIG. 2. Intermediate FET power switches Sw2-Sw5 in the illustrated example may be low-power FETs (e.g., having a breakdown voltage $BV_{DS}$ as low as ⅓$V_{IN}$). However, the top power switch Sw1 and the bottom power switch (Sw6 in this example) should be capable of withstanding the worst-case voltage condition to which the power converter might reasonably be subjected in an intended application (e.g., having a breakdown voltage $BV_{DS}$ greater or equal to $V_{IN}$), and optionally should be selected to saturate before any of the remaining power switches saturate (i.e., switches Sw2-Sw5 in the illustrated example). Both protective switches Sw1, Sw6 may be identical with respect to breakdown voltage and saturation current characteristics, but need not be identical in some applications. While protective switches Sw1, Sw6 are shown as FETs in FIG. 3, in some embodiments, the protective switches Sw1, Sw6 may be implemented in other technologies, such as bipolar junction transistors (BJTs).

In the illustrated embodiment, the gates (control inputs) of the top and bottom protective power FET switches are shown coupled to respective switch controllers 302a, 302b, which may include suitable voltage level shifters and drivers as may be needed to open or close the associated FETs. The illustrated switch controllers 302a, 302b are shown as distinct circuit blocks, but may be implemented as a single circuit block. The switch controllers 302a, 302b are shown coupled to one or more sensing circuits 304a, 304b that may cause the switch controllers 302a, 302b to force open one or both of the top and bottom protective switches (Sw1 and Sw6 in this example) in the event of a transient or fault condition. Such action alone would provide protection for the intermediate FET power switches. However, as discussed in greater detail below, selecting high-voltage and lower saturation current characteristics for the bracketing top and bottom protective switches may alone provide protection for the intermediate FET power switches, and accordingly the switch controllers 302a, 302b and sensing circuits 304a, 304b may be omitted in some applications.

In normal converter operation, the gates of the top and bottom protective power FET switches would be controlled, along with the intermediate power switches, by associated clock signals $CLK_X$ as in a conventional power converter. The controlling clock signals $CLK_X$ for each set of power switches during normal conversion operation are generally non-overlapping and complementary. In the example shown in FIG. 3, the clock signals CLK1, CLK6 for the top and bottom protective power FET switches Sw1, Sw6 may be coupled through the respective switch controllers 302a, 302b so that the normal clocking sequence may be interrupted as needed when the FET switches Sw1, Sw6 are to be forced to an open state. In some embodiments, the switch controllers 302a, 302b may be as simple as a single AND-gate coupled to the gates of their associated top and bottom FET power switches (through suitable voltage level shifters and drivers if needed), with a corresponding clock signal coupled to a first AND-gate input and the output of a sensing circuit coupled to a second AND-gate input. In the event of a transient or fault condition, the sensing circuit would actively set the associated FET power switch to an OFF state or to a high $R_{ON}$ state.

The embodiment shown in FIG. 3 provides actively controlled protection for the intermediate FET power switches in response to the one or more sensing circuits 304a, 304b. Such sensing circuitry helps limit how much power is dropped across the top and bottom FET power switches by stopping power flow during prolonged transient or fault conditions and is also helpful during startup. However, by selecting high-voltage and lower saturation current characteristics for the bracketing top and bottom protective switches, fast automatic (passive) protection can be provided for the intermediate FET power switches without such active control circuitry. Saturation occurs when increasing drain-to-source voltage applied to a FET at a specific level of gate-source voltage, $V_{GS}$, can no longer increase the drain-to-source current—that is, current becomes substantially constant above the $V_{DS}$ saturation point. Thus, lower saturation current characteristics for the bracketing top and bottom protective switches relative to the intermediate FET power switches ensures that during a large over-current event while $V_{IN}$ is connected to the power converter (i.e., Sw1 is closed), the top high-voltage FET power switch Sw1 will saturate before the intermediate FET power switches saturate, and thus the top high-voltage FET power switch Sw1 can automatically limit current to safe levels for all low-voltage switches. The designed high-voltage characteristic of the top FET power switch Sw1 ensures that it can handle the maximum expected voltage for the application.

Similarly, the bottom FET power switch (Sw6 in this example) can be selected so that it will saturate before the intermediate power switches saturate. This ensures that during a large over-current event while connected to a fly capacitor referenced to $V_{IN}$ (e.g., when Sw6 is closed), the bottom FET power switch will saturate before the intermediate power switches saturate, and thus the bottom high-voltage FET power switch can automatically limit current to safe levels for all low-voltage switches. Notably, the power converter may continue operation since the top and bottom protective power FET switches need not necessarily be forced to an open state by the controller, as may be the case for short-duration transient or fault conditions.

Accordingly, top and bottom high-voltage, low-saturation power FET switches automatically protect against a transient event and enable use of low-voltage FETs for the remaining intermediate power switches. Thus, in some applications, the switch controllers 302a, 302b and sensing circuits 304a, 304b may be omitted.

The embodiment shown in FIG. 3 is one example of a circuit and corresponding method for protecting a multi-level power converter that needs no more than two high-voltage FET switches while allowing all of the other power switches to be low-voltage FET switches. The protection is fast and automatic when the bracketing top and bottom high-voltage FET switches have low saturation characteristics relative to the intermediate power switches, while also being controllable by opening the protective FET switches when transients or fault conditions occur.

Second Embodiment

Figure 4:
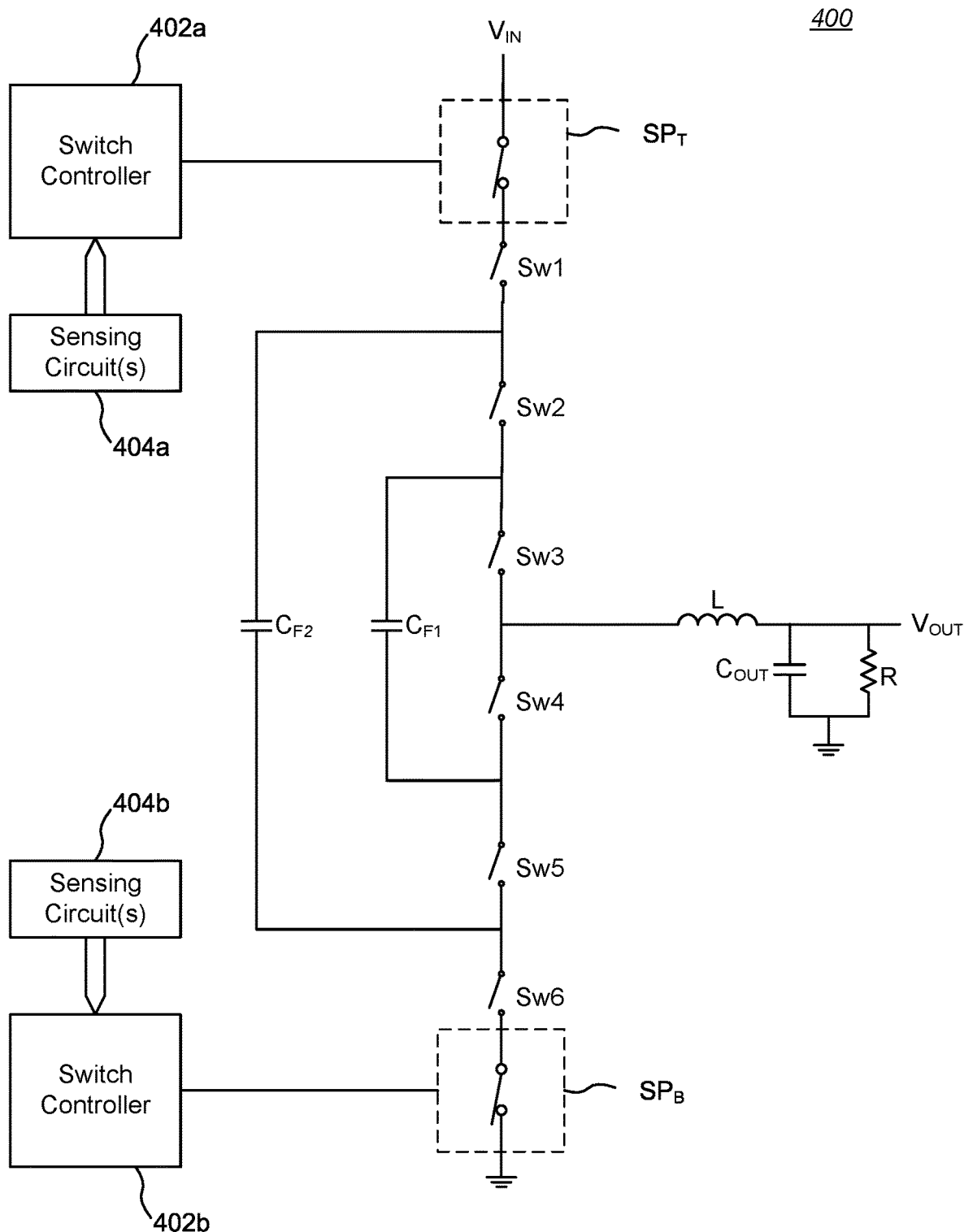
FIG. 4 is a block diagram of a second embodiment of a multi-level converter circuit with protection circuitry in accordance with the present invention.

FIG. 4 is a block diagram of a second embodiment 400 of a multi-level converter circuit with protection circuitry in accordance with the present invention. The illustrated multi-level converter circuit is a 4-level multi-level DC-to-DC converter similar in many aspects to the multi-level converter circuit of FIG. 3. However, instead of requiring that the "top" and "bottom" FET switches be high-voltage FETs, a first normally-closed protective switch $SP_T$ is added in series between $V_{IN}$ and a top low-voltage FET switch (Sw1), and a second normally-closed protective switch $SP_B$ is added in series between a bottom low-voltage FET switch (Sw6) and a reference voltage (e.g., circuit ground).

The protective switches $SP_T$, $SP_B$ are shown coupled to respective switch controllers 402a, 402b, which may be coupled to one or more respective sensing circuits 404a, 404b that cause the switch controllers 402a, 402b to open one or both of the protective switches $SP_T$, $SP_B$. For example, a voltage detector coupled to $V_{IN}$ may provide an "overvoltage" trigger signal to the switch controllers 402a, 402b when $V_{IN}$ exceeds or falls below a set threshold voltage. In some embodiments, such a voltage detector may alone be one or both of the switch controllers 402a, 402b. In some embodiments, the switch controllers 402a, 402b may be coupled to multiple sensing or measurement circuits so as to be able to open the associated protective switches $SP_T$, $SP_B$ in response to multiple types of transient events or fault events, such as thermal shutdown of the power converter, over-current detection through the power converter, output over-voltage and/or under-voltage detection, and/or capacitor faults (e.g., charge imbalances, open or short detections, etc.). In some embodiments, the switch controllers 402a, 402b may also respond to external supplied signals or commands that can cause the associated protective switches $SP_T$, $SP_B$ to open or close.

As noted above, the protective switches $SP_T$, $SP_B$ are normally-closed and thus normally always ON (conducting)—that is, the protective switches $SP_T$, $SP_B$ are not subject to the normal toggling of the power switches $Sw_X$. As always-ON devices, the protective switches $SP_T$, $SP_B$ may be easier to implement. For example, the protective switches $SP_T$, $SP_B$ potentially may be fabricated using any of a number of processes or technologies (e.g., as FET, bipolar, or MEMS switches), and need not be identical. The protective switches $SP_T$, $SP_B$ may be fabricated on the same integrated circuit (IC) die as the power switches $Sw_X$, or may be fabricated on a different IC die and co-packaged with the IC die bearing the power switches $Sw_X$, or may be off-chip discrete devices coupled to an IC die on which the power switches $Sw_X$ are fabricated, such as on a printed circuit board (PCB).

In various embodiments, the power switches $Sw_X$ in the multi-level power converter of FIG. 4 may all be implemented as low-voltage FET switches, since triggered opening of the protective switches $SP_T$, $SP_B$ will generally protect the top and bottom FET power switches (S1, S6 in the illustrated example) from high values of $V_{IN}$ while the intermediate FET power switches (S2-S5 in the illustrated example) are protected from excessive voltages not only by the protective switches $SP_T$, $SP_B$ but by the voltages on their associated bracketing fly capacitors $C_{FX}$.

While illustrated switch controllers 402a, 402b are shown as distinct circuit blocks, they may be implemented as a single circuit block. The switch controllers 402a, 402b may be implemented on the same IC die as their associated protective switches $SP_T$, $SP_B$, and/or may be part of the overall controller for the power converter (such as part of a power converter controller like controller 108 in FIG. 1).

When the protective switches $SP_T$, $SP_B$ are implemented as MOSFETs, since they are normally conducting and are not part of the switching cycle for the power switches $Sw_X$, the gate charge of the protective switches $SP_T$, $SP_B$ does not add to transition losses for the power converter. This can be an efficiency advantage when the power switches $Sw_X$ are switching at high frequencies.

Note that the presence of the top protective switch $SP_T$ provides an additional advantage during startup of the power converter. The problem of startup in-rush current can be alleviated and possibly eliminated by use of the top protective switch $SP_T$ to provide a "soft start" mode of operation that controls in-rush current to a power converter until the fly capacitors $C_{FX}$ are sufficiently charged to allow the power switches to begin normal charge transfers. For example, while the fly capacitors are first being soft-started, the top protective switch $SP_T$ protects the power FETs from high levels of $V_{IN}$ in the manner described above. In addition, a FET-based top protective switch $SP_T$ can be actively controlled through the switch controller 402a to function as a fixed current source or resistor (i.e., by operating the top protective switch $SP_T$ in saturation rather than in its linear region). Alternatively, a current source or resistor (not shown) added in parallel with the top protective switch $SP_T$ can be used as a "bypass" current path to slowly control charging of the fly capacitors while the top protective switch $SP_T$ continues to provide over-voltage protection.

Third Embodiment

Figure 5:
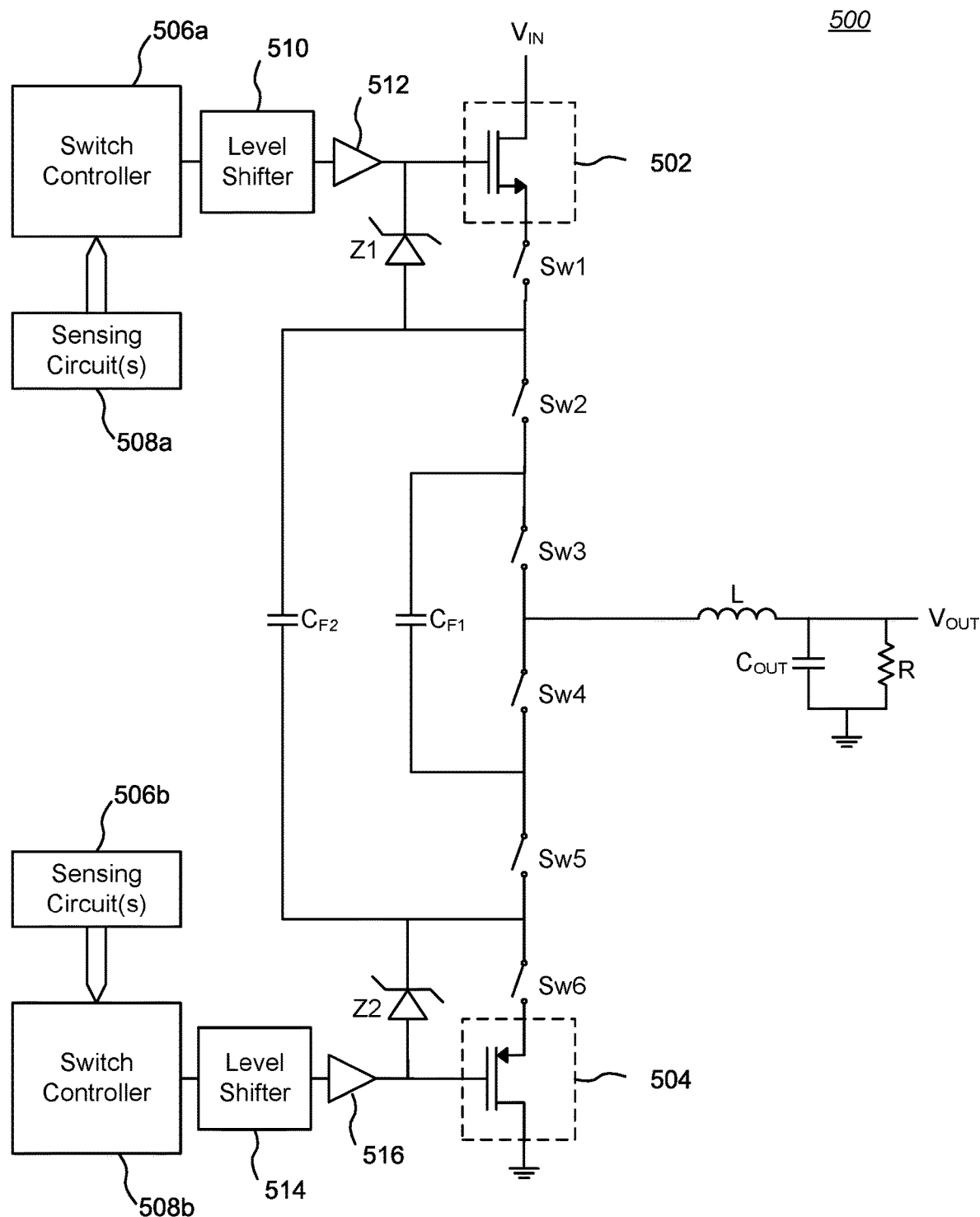
FIG. 5 is a block diagram of a third embodiment of a multi-level converter circuit with protection circuitry in accordance with the present invention.

FIG. 5 is a block diagram of a third embodiment 500 of a multi-level converter circuit with protection circuitry in accordance with the present invention. The illustrated multi-level converter circuit is a 4-level multi-level DC-to-DC converter variant of the multi-level converter circuit of FIG. 4. In the illustrated embodiment, the protective switches $SP_T$, $SP_B$ of FIG. 4 are shown respectively implemented as FET protective switches 502, 504. More specifically, protective switch $SP_T$ is implemented as a high-voltage N-type MOSFET, while protective switch $SP_B$ is implemented as a high-voltage P-type MOSFET. In alternative embodiments, the protective switch $SP_T$ may be implemented as a high-voltage switch NPN bipolar junction transistor and the protective switch $SP_B$ may be implemented as a high-voltage switch PNP bipolar junction transistor.

Switch controllers 506a, 506b provide a suitable control signal to the corresponding gates of the FET protective switches 502, 504 through respective level shifters 510, 514 and driver circuits 512, 516. Power for the level shifters 510, 514 and driver circuits 512, 516 may be provided, for example, by a simple charge pump (not shown) coupled between $V_{IN}$ and a linear regulator (not shown). In addition, the switch controllers 506a, 506b may be coupled to one or more respective sensing circuits 508a, 508b that cause the switch controllers 506a, 506b to open one or both of the FET protective switches 502, 504 in response to transients or fault conditions. While illustrated switch controllers 506a, 506b are shown as distinct circuit blocks, they may be implemented as a single circuit block.

As in the embodiment of FIG. 4, the top FET protective switch 502 is coupled to $V_{IN}$ and is normally closed (conducting), and accordingly its nodes are not subject to any switching voltages, thereby reducing loss. Similarly, the bottom FET protective switch 504 is coupled to a reference voltage (e.g., circuit ground) and is normally closed (conducting), and accordingly its nodes are not subject to any switching voltages, again reducing loss.

When a fault condition occurs, the switch controllers 506a, 506b may be triggered by the sensing circuits(s) 508a, 508b and open the FET protective switches 502, 504. In addition, the top FET protective switch 502 should, in general, be selected so that it will saturate before the power switches $Sw_X$ saturate. This ensures that during a large over-current event while $V_{IN}$ is connected to the power converter (i.e., Sw1 is closed), the FET protective switch 502 will saturate before the intermediate power FETs (Sw1-Sw6 in this example) in the converter stack saturate, and thus the FET protective switch 502 will absorb any high voltage (up to the point of breakdown). Early entry into saturation by the FET protective switch 502 essentially limits current flow from exceeding safe levels for all low-voltage switches by keeping them operating in their linear region with very little voltage drop across them.

Similarly, the bottom FET protective switch 504 should be selected so that it will saturate before the power switches $Sw_X$ saturate. This ensures that during a large over-current event while connected to a fly capacitor (e.g., Sw6 is closed), the FET protective switch 504 will saturate before the power FETs in the converter stack saturate, and thus the FET protective switch 504 will absorb any high voltage.

Accordingly, the top and bottom FET protective switches 502, 504, while normally closed, may be switched to an open protective state either under active logic control when a fault condition occurs, or automatically when a transient occurs and one or both of the FET protective switches 502, 504 saturate. In either case, the designed high-voltage characteristic of the FET protective switches 502, 504 ensures that they can handle the maximum expected voltage for the application.

The saturation point of the FET protective switches 502, 504 relative to the saturation point of the low-voltage intermediate power FETs preferably should be chosen to also guarantee that the fly capacitors $C_{FX}$ should be capable of maintaining their respective voltages on all their associated power switches $Sw_X$. If the low-voltage intermediate power FETs are not saturated, then the fly capacitors $C_{FX}$ should be able to maintain their node voltages. Accordingly, if the fly capacitors $C_{FX}$ have not fully charged (e.g., at startup), the FET protective switches 502, 504 absorb the difference in voltage while the fly capacitors are referenced to circuit ground (e.g., the bottom power switch Sw6 is closed, in which case FET protective switch 502 protects the intermediate power FETs) or are referenced to $V_{IN}$ (e.g., the top power switch Sw1 is closed, in which case FET protective switch 504 protects the intermediate power FETs.

Note that when the top FET protective switch 502 is closed, then (without more) the top power switch Sw1, when open, could be exposed to high values of $V_{IN}$ n or to current-induced voltage spikes. However, by adding an auxiliary protection circuit, the voltage across the open top power switch Sw1 can be clamped to a controlled level less than its breakdown voltage. In the illustrated example, the auxiliary protection circuit comprises a Zener diode Z1 between the gate of the top FET protective switch 502 and the bottom terminal (source) of power switch Sw1 (i.e., the terminal farthest from $V_{IN}$). The Zener voltage value for Z1 preferably approximates the breakdown voltage of power switch Sw1 (e.g., 5V for both devices). The top FET protective switch 502 is a source follower, which means the source is a threshold voltage $V_{TH}$ below the gate voltage. Thus, if the gate voltage is limited to the voltage across Z1 when power switch Sw1 is closed, then the source of the top FET protective switch 502 is also limited to that voltage, which will clamp the voltage across power switch Sw1 to the Zener voltage Z1 minus the $V_{TH}$ of the top FET protective switch 502 (i.e., to Z1–$V_{TH}$), and the top FET protective switch 502 will absorb any voltage drop that exceeds that level. Accordingly, the top FET protective switch 502 and the auxiliary protection circuit function as a nearly-instantaneous clamping circuit protecting the top power switch Sw1 from excessive voltages, thereby allowing the top power switch Sw1 to be implemented as a low-voltage device (e.g., a FET with a $BV_{DS}$ that can be as low as the Z1 voltage, which may be as low as $V_{IN}/3$ in this example). As should be appreciated, other circuits may be used in place of the Zener diodes to perform voltage limiting.

A similar approach may be used to clamp the voltage across the bottom power switch (Sw6 in this example), except that the protective switch is a P-type MOSFET 504 and a Zener diode Z2 is coupled between the gate of the bottom FET protective switch 504 and the top terminal (drain) of power switch Sw5 (i.e., the terminal farthest from circuit ground). The gate drive voltage requirements for an enhancement mode P-type MOSFET may require a negative value below circuit ground. In applications where such a voltage may not be available, a depletion mode P-type MOSFET may be employed in lieu of the P-type MOSFET 504, since a negative drive voltage generally would not be necessary.

In variant embodiments, either the top FET protective switch 502 or the top power switch Sw1 can be selected to saturate first (rather than selecting the top FET protective switch 502 to saturate before the top power switch Sw1). If the top power switch Sw1 saturates first, the voltage across it will start to climb but when the voltage exceeds the Zener voltage of Z1, then the top FET protective switch 502 will begin protecting the top power switch Sw1. Thus, Zener diode Z1 combined with the top FET protective switch 502 allows the top power switch Sw1 to saturate without exceeding damaging voltage levels. The same concept applies to the bottom FET protective switch 504 in combination with Zener diode Z2, which allow bottom power switch (Sw6 in this example) to saturate without exceeding damaging voltage levels.

Fourth Embodiment

Figure 6:
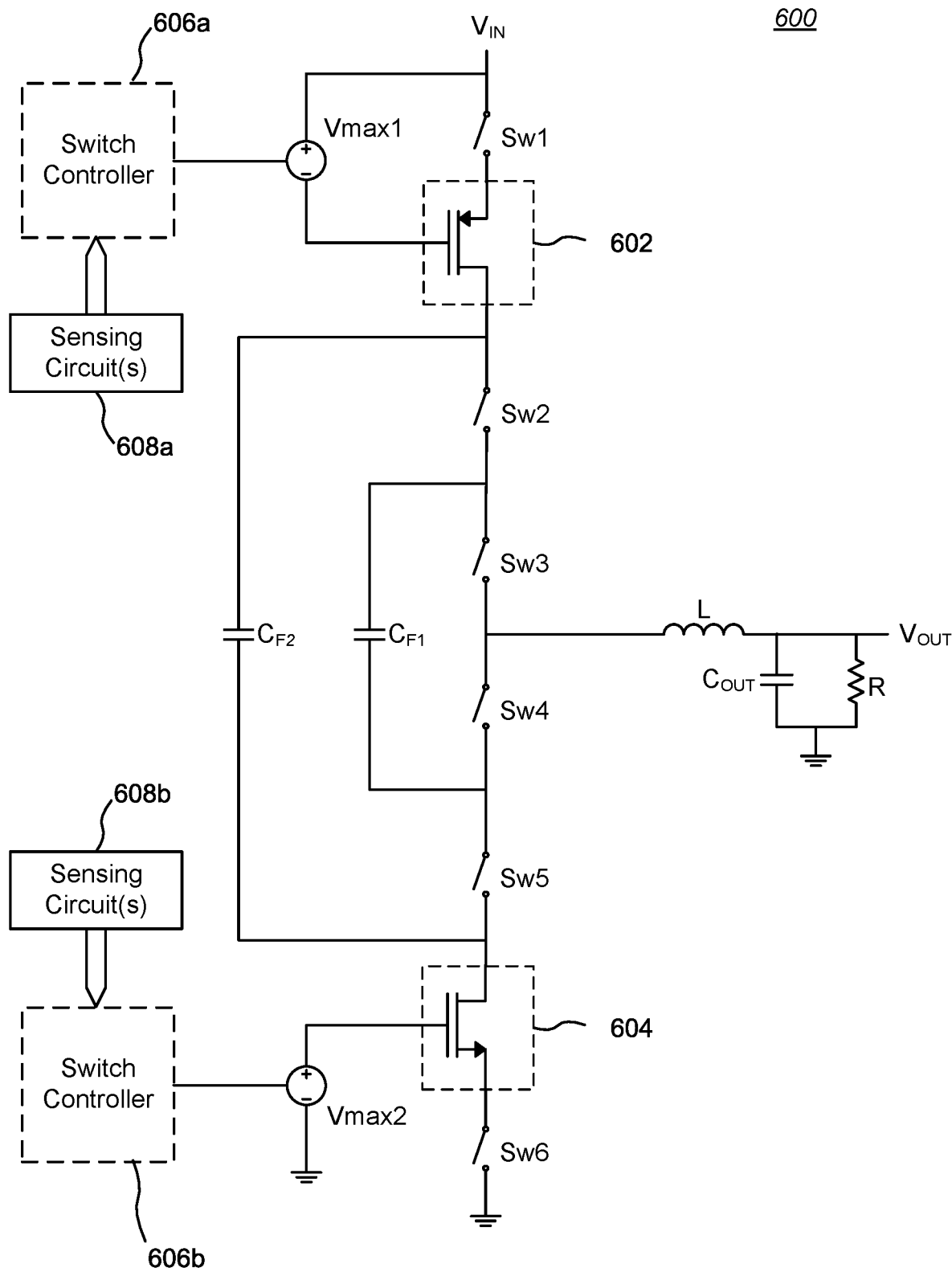
FIG. 6 is a block diagram of a fourth embodiment of a multi-level converter circuit with protection circuitry in accordance with the present invention.

FIG. 6 is a block diagram of a fourth embodiment 600 of a multi-level converter circuit with protection circuitry in accordance with the present invention. The illustrated multi-level converter circuit is a 4-level multi-level DC-to-DC converter variant of the multi-level converter circuit of FIG. 4. In the illustrated embodiment, the protective switches $SP_T$, $SP_B$ of FIG. 4 are shown respectively implemented by FET protective switches 602, 604. More specifically, protective switch $SP_T$ is implemented as a high-voltage P-type MOSFET, while protective switch $SP_B$ is implemented as a high-voltage N-type MOSFET.

The P-type top FET protective switch 602 is shown positioned between the top power switch (Sw1) and the next power switch (Sw2) in the illustrated stack of power switches $Sw_X$. Similarly, the N-type bottom FET protective switch 604 is shown positioned between the bottom power switch (Sw6) and the preceding power switch (Sw5) in the illustrated stack of power switches $Sw_X$. A voltage source Vmax1 is coupled between $V_{IN}$ and the gate of the top FET protective switch 602. Similarly, a voltage source Vmax2 is coupled between a reference voltage (e.g., circuit ground) and the gate of the bottom FET protective switch 604 (Sw6 in this example).

Optional switch controllers 606a, 606b may be coupled to one or both of the voltage sources Vmax1 and Vmax2 and to one or more sensing circuits 608a, 608b that cause the switch controllers 402a, 402b to alter the voltages of Vmax1 and/or Vmax2 to open one or both of the FET protective switches 602, 604 in response to transients or fault conditions. In alternative embodiments, the optional switch controllers 606a, 606b may be coupled to directly control operation of the respective FET protective switches 602, 604. In either case, this cascode configuration for the FET protective switches 602, 604 protects all of the low-voltage power switches $Sw_X$ at all times, and thus the low-voltage power switches $Sw_X$ may be turned OFF (opened) during a transient or a fault condition instead of turning OFF (opening) the high-voltage FET protective switches 602, 604, with the same effect. This means that the FET protective switches 602, 604 could be permanently connected respectively to Vmax1 and Vmax2 and never toggled OFF—instead, the top power switch Sw1 and the bottom power switch (Sw6 in this example) can do the toggling. While illustrated switch controllers 606a, 606b are shown as distinct circuit blocks, they may be implemented as a single circuit block.

As with the embodiment of FIG. 4, in some embodiments, the top and bottom FET protective switches 602, 604 may be selected so that they will saturate before the power switches $Sw_X$ saturate. This ensures that during a large over-current event while one or more of the power switches $Sw_X$ is closed, the FET protective switches 602, 604 will saturate before the power FETs $Sw_X$ in the converter stack saturate, and thus the high-voltage FET protective switches 602, 604 will absorb any excessively high voltage. In variant embodiments, either the top FET protective switch 602 or the top power switch Sw1 may be selected to saturate first (rather than selecting the top FET protective switch 602 to saturate before the top power switch Sw1). Similarly in such variant embodiments, either the bottom FET protective switch 604 or the bottom power switch (Sw6 in this example) may be selected to saturate first (rather than selecting the bottom FET protective switch 604 to saturate before the bottom power switch Sw6).

As in the embodiment of FIG. 4, the top FET protective switch 602 is normally closed (conducting). Similarly, the bottom FET protective switch 604 is normally closed (conducting). It might seem that the position of the FET protective switches 602, 604 may not provide protection for the top and bottom power switches (Sw1 and Sw6 in this example). However, the voltage sources Vmax1 and Vmax2 should be set to at least the maximum voltage that the associated power switch (Sw1 and Sw6) can handle (e.g., Vmax1≥$BV_{DS}$ for Sw1, Vmax2≥$BV_{DS}$ for Sw6), and the top and bottom FET protective switches 602, 604 should be configured to handle any excess voltage above that level. For example, if the maximum expected voltage for $V_{IN}$ is 15V, and the top power switch Sw1 has a breakdown voltage of 5V, then the voltage source Vmax1 should be set at 5V (or at 5V plus the threshold voltage $V_{TH}$ of the switch Sw1) and the top FET protective switch 602 should be designed to withstand at least 10V. If the actual value of $V_{IN}$ exceeds Vmax1, then the top FET protective switch 602 will saturate and thus automatically limit current, thereby limiting the voltage to which power switch Sw1 is subjected.

The saturation point of the FET protective switches 602, 604 preferably should be chosen to also guarantee that the fly capacitors $C_{FX}$ will be capable of maintaining their respective voltages on all their associated power switches $Sw_X$. If the low-voltage intermediate power FETs are not saturated, then the fly capacitors $C_{FX}$ will be able to maintain their node voltages. Accordingly, if the fly capacitors $C_{FX}$ have not fully charged (e.g., at startup), the FET protective switches 602, 604 absorb the difference in voltage while the fly capacitors are referenced to circuit ground (e.g., the bottom power switch Sw6 is closed).

Example Control Circuitry for an M-Level Converter Cell

Figure 7:
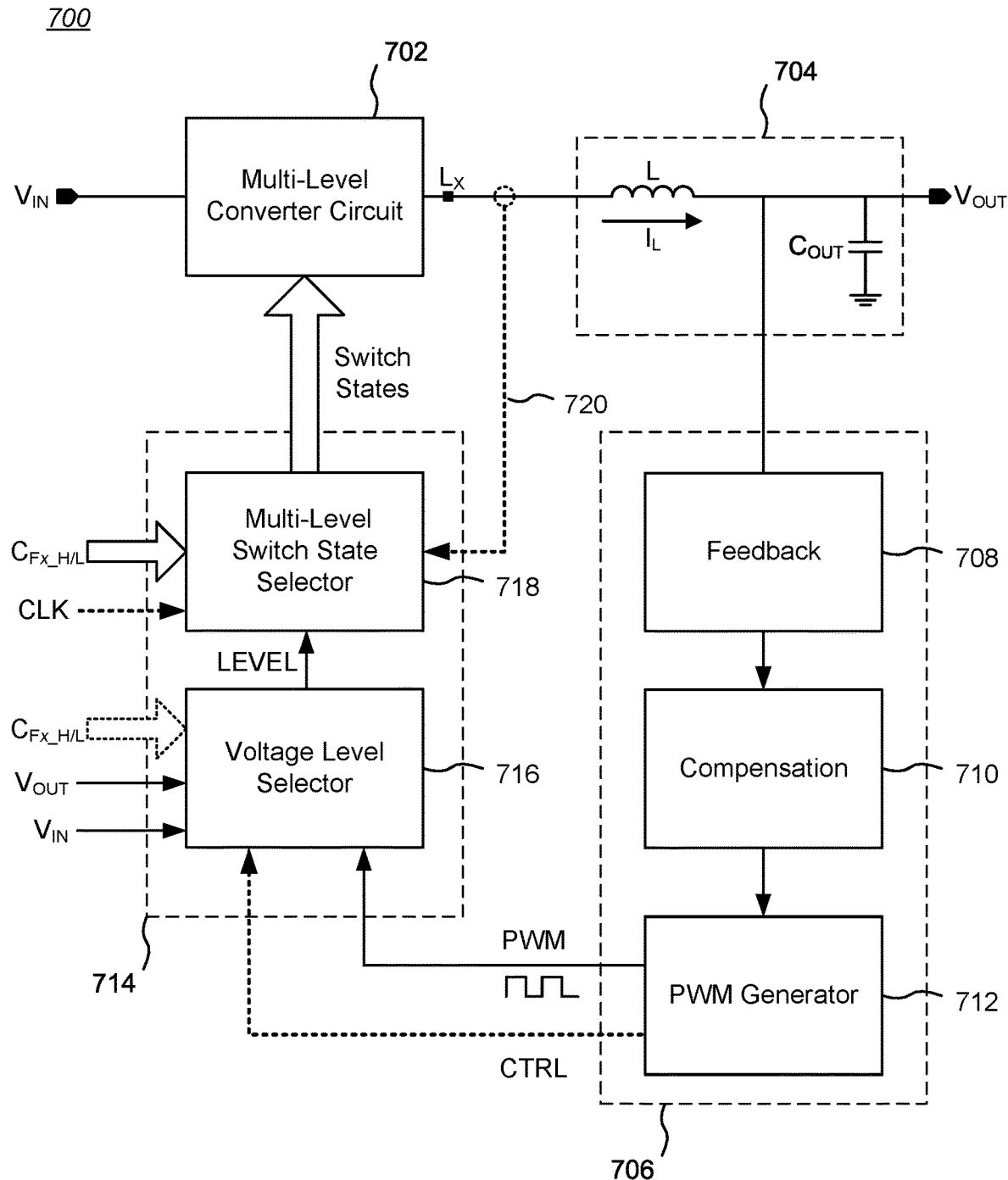
FIG. 7 is a block diagram of one embodiment of control circuitry for an M-level converter cell coupled to an output block comprising an inductor L and an output capacitor $C_{OUT}$.

FIG. 7 is a block diagram of one embodiment of control circuitry 700 for an M-level converter cell 702 coupled to an output block 704 comprising an inductor L and an output capacitor $C_{OUT}$ (conceptually, the inductor L also may be considered as being included within the M-level converter cell 401). This example control circuitry 700 is adapted from the teachings set forth in U.S. Patent Application Ser. No. 63/276,923, filed Nov. 8, 2021, entitled "Controlling Charge-Balance and Transients in a Multi-Level Power Converter", assigned to the assignee of the present invention, the contents of which are incorporated by reference. However, the present invention may be used in combination with other types of control circuitry for an M-level converter cell 702.

The control circuitry 700 functions as a control loop coupled to the output of the M-level converter cell 702 and to switch control inputs of the M-level converter cell 702. In general, the control circuitry 700 is configured to monitor the output (e.g., voltage and/or current) of the M-level converter cell 702 and dynamically generate a set of switch control inputs to the M-level converter cell 702 that attempt to stabilize the output voltage and/or current at specified values, taking into account variations of $V_{IN}$ and output load. In alternative embodiments, the control circuitry 700 may be configured to monitor the input of the M-level converter cell 702 (e.g., voltage and/or current) and/or an internal node of the M-level converter cell 702 (e.g., the voltage across one or more fly capacitors or the current through one or more power switches). Accordingly, most generally, the control circuitry 700 may be configured to monitor the voltage and/or current of a node (e.g., input terminal, internal node, or output terminal) of the M-level converter cell 702. The control circuitry 700 may be incorporated into, or separate from, the overall controller 104 for a power converter 100 embodying the M-level converter cell 702.

A first block comprises a feedback controller 706, which may be a traditional controller such as a fixed frequency voltage mode or current mode controller, a constant-on-time controller, a hysteretic controller, or any other variant. The feedback controller 706 is shown as being coupled to $V_{OUT}$ from the M-level converter cell 702. In alternative embodiments, the feedback controller 706 may be configured to monitor the input of the M-level converter cell 702 and/or an internal node of the M-level converter cell 702. The feedback controller 706 produces a signal directly or indirectly indicative of the voltage at $V_{OUT}$ that determines in general terms what needs to be done in the M-level converter cell 702 to maintain desired values for $V_{OUT}$: charge, discharge, or tristate (i.e., open, with no current flow).

In the illustrated example, the feedback controller 706 includes a feedback circuit 708, a compensation circuit 710, and a PWM generator 712. The feedback circuit 708 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal to indicate whether $V_{OUT}$ is above or below the target voltage. The feedback-loop voltage detector may be implemented with a comparison device, such as an operational amplifier (op-amp) or transconductance amplifier (gm amplifier).

The compensation circuit 710 is configured to stabilize the closed-loop response of the feedback controller 706 by avoiding the unintentional creation of positive feedback, which may cause oscillation, and by controlling overshoot and ringing in the step response of the feedback controller 706. The compensation circuit 710 may be implemented in known manner, and may include LC and/or RC circuits.

The PWM generator 712 generates the actual PWM control signal which ultimately sets the duty cycle of the switches of the M-level converter cell 702. In some embodiments, the PWM generator 712 may pass on additional optional control signals CTRL indicating, for example, the magnitude of the difference between $V_{OUT}$ and the reference voltage (thus indicating that some levels of the M-level converter cell 702 should be bypassed to get to higher or lower levels), and the direction of that difference (e.g., $V_{OUT}$ being greater than or less than the reference voltage). In other embodiments, the optional control signals CTRL can be derived from the output of the compensation circuit 710, or from the output of the feedback circuit 708, or from a separate comparator (not shown) coupled to, for example, $V_{OUT}$. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 714, the primary function of which is to select the switch states that generate a desired $V_{OUT}$ while maintaining a charge-balance state on the fly capacitors within the M-level converter cell 702 every time an output voltage level is selected, regardless of what switch state or states were used in the past.

The M-level controller 714 includes a Voltage Level Selector 716 which receives the PWM control signal and the additional control signals CTRL if available. In addition, the Voltage Level Selector 716 may be coupled to $V_{OUT}$ and/or $V_{IN}$, and, in some embodiments, to HIGH/LOW status signals, $C_{Fx\_H/L}$, from voltage detectors coupled to corresponding fly capacitors $C_{Fx}$ within the M-level converter cell 702. A function of the Voltage Level Selector 716 is to translate the received signals to a target output voltage level (e.g., on a cycle-by-cycle basis). The Voltage Level Selector 716 typically will consider at least $V_{OUT}$ and $V_{IN}$ to determine which target level should charge or discharge the output of the M-level converter cell 702 with a desired rate.

The output of the Voltage Level Selector 716 is coupled to an M-level Switch State Selector 718, which generally would be coupled to the status signals, $C_{Fx\_H/L}$, from the capacitor voltage detectors for the fly capacitors $C_F$x. Taking into account the target level generated by the Voltage Level Selector 716, the M-level Switch State Selector 718 determines which switch state for the desired output level should be best for capacitor charge-balance. The M-level Switch State Selector 718 may be implemented, for example, as a look-up table (LUT) or as comparison circuitry and combinatorial logic or more generalized processor circuitry. The output of the M-level Switch State Selector 718 is coupled to the switches of the M-level converter cell 702 (through appropriate level-shifter circuits and drivers circuits, as may be needed for a particular converter cell) and includes the switch state settings determined by the M-level Switch State Selector 718 (which selects the configuration of switches within the M-level converter cell 702 corresponding to a selected target level).

In general (but not always), the Voltage Level Selector 716 and the M-level Switch State Selector 718 only change their states when the PWM signal changes. For example, when the PWM signal goes high, the Voltage Level Selector 716 selects which level results in charging of the inductor L and the M-level Switch State Selector 718 sets which version to use of that level. Then when the PWM signal goes low, the Voltage Level Selector 716 selects which level should discharge the inductor L and the M-level Switch State Selector 718 sets which version of that level to use. Thus, the Voltage Level Selector 716 and the M-level Switch State Selector 718 generally only change states when the PWM signal changes (the PWM signal is in effect their clock signal). However, there may be situations or events where it is desirable for the CTRL signals to change the state of the Voltage Level Selector 716. Further, there may be situations or events where it is desirable for the $C_{Fx\_H/L}$ status signal(s) from voltage detectors coupled to the fly capacitors $C_{Fx}$ within the M-level converter cell 702 to cause the M-level Switch State Selector 718 to select a particular configuration of power switch settings, such as when a severe mid-cycle imbalance occurs. In some embodiments, it may be useful to include a timing function that forces the M-level Switch State Selector 718 to re-evaluate the optimal version of the state periodically, for example, in order to avoid being "stuck" at one level for a very long time, potentially causing charge imbalances.

In embodiments that utilize the teachings set forth in the patent application entitled "Controlling Charge-Balance and Transients in a Multi-Level Power Converter" referenced above, the M-level controller 714 implements a control method for the M-level converter cell 702 that selects an essentially optimal switch state which moves the fly capacitors $C_{Fx}$ towards a charge-balance state every time a voltage level at the Lx node is selected, regardless of what switch state or states were used in the past. Accordingly, such multi-level converter circuits are free to select a different switch state or Lx voltage level every switching cycle without a need to keep track of any prior switch state or sequence of switch states.

One notable benefit of the control circuitry shown in FIG. 7 is that it enables generation of voltages in boundary zones between voltage levels, which represent unattainable output voltages for conventional multi-level DC-to-DC converter circuits.

In alternative unregulated charge-pumps embodiments, the feedback controller 706 and the Voltage Level Selector 716 may be omitted, and instead a clock signal CLK may be applied to the M-level Switch State Selector 718. The M-level Switch State Selector 718 would generate a pattern of switch state settings that periodically charge balances the fly capacitors $C_{Fx}$ regardless of what switch state or states were used in the past (as opposed to cycling through a pre-defined sequency of states). This ensures that if $V_{IN}$ changes or anomalous evens occur, the system generally always seeks charge balance for the fly capacitors $C_{Fx}$.

In some embodiments, the M-level Switch State Selector 718 may take into account the current $I_L$ flowing through the inductor L by way of an optional current-measurement input 720, which may be implemented in conventional fashion.

While FIG. 7 shows a particular embodiment of control circuitry for an M-level converter cell as modified in accordance with the present invention, it should be appreciated that other control circuits may be adapted or devised to provide suitable switching signals for the switches within a converter cell.

Methods

Figure 8:
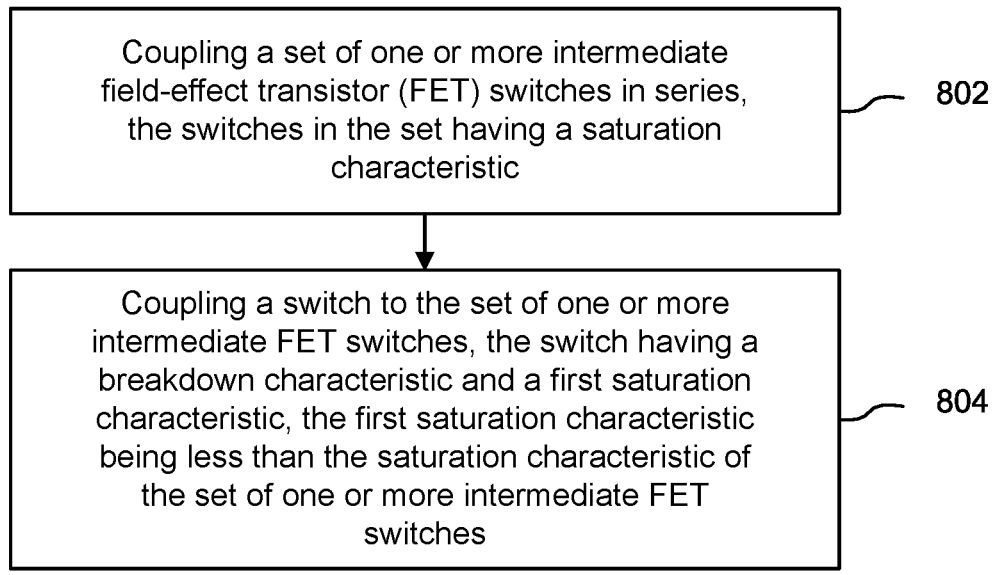
FIG. 8 is a process flow chart showing a first method for protecting a power converter.

Another aspect of the invention includes various methods for protecting a power converter. For example, FIG. 8 is a process flow chart 800 showing a first method for protecting a power converter. The method includes: coupling a set of one or more intermediate field-effect transistor (FET) switches in series, the switches in the set having a saturation characteristic (Block 802); and coupling a switch to the set of one or more intermediate FET switches, the switch having a breakdown characteristic and a first saturation characteristic, the first saturation characteristic being less than the saturation characteristic of the set of one or more intermediate FET switches (Block 804).

Figure 9:
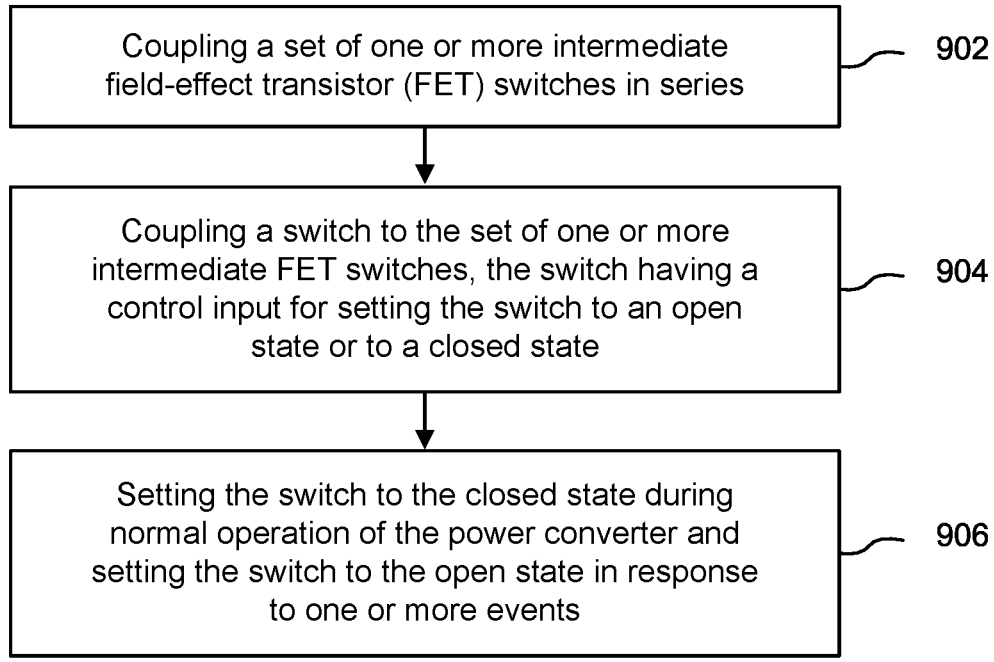
FIG. 9 is a process flow chart showing a second method for protecting a power converter.

As another example, FIG. 9 is a process flow chart 900 showing a second method for protecting a power converter. The method includes: coupling a set of one or more intermediate field-effect transistor (FET) switches in series (Block 902); coupling a switch to the set of one or more intermediate FET switches, the switch having a control input for setting the switch to an open state or to a closed state (Block 904); and setting the switch to the closed state during normal operation of the power converter and setting the switch to the open state in response to one or more events (Block 906).

Figure 10:
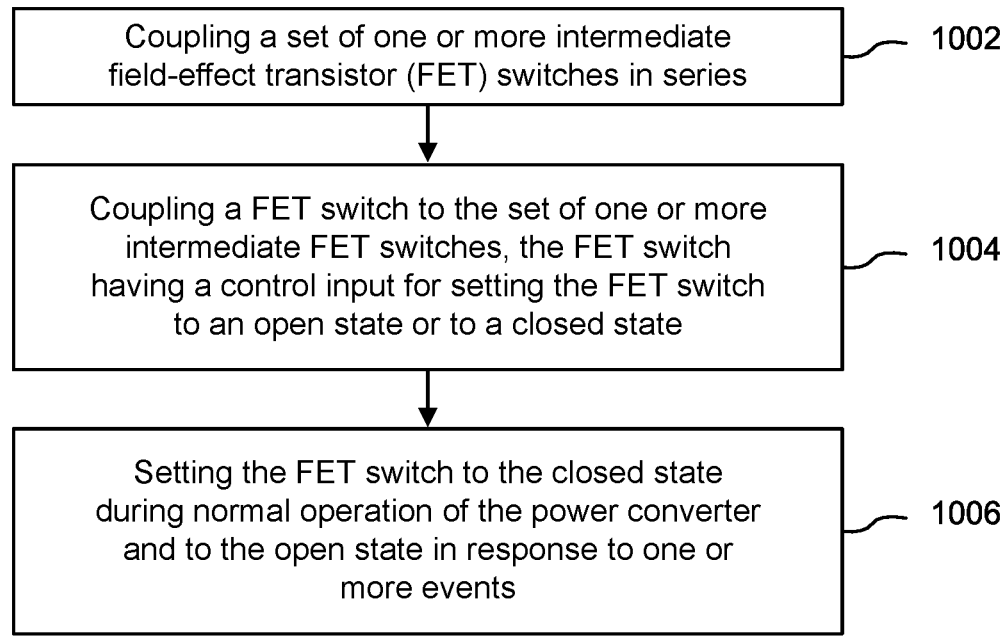
FIG. 10 is a process flow chart showing a third method for protecting a power converter.

As still another example, FIG. 10 is a process flow chart 1000 showing a third method for protecting a power converter. The method includes: coupling a set of one or more intermediate field-effect transistor (FET) switches in series (Block 1002); coupling a FET switch to the set of one or more intermediate FET switches, the FET switch having a control input for setting the FET switch to an open state or to a closed state (Block 1004); and setting the FET switch to the closed state during normal operation of the power converter and to the open state in response to one or more events (Block 1006).

Figure 11:
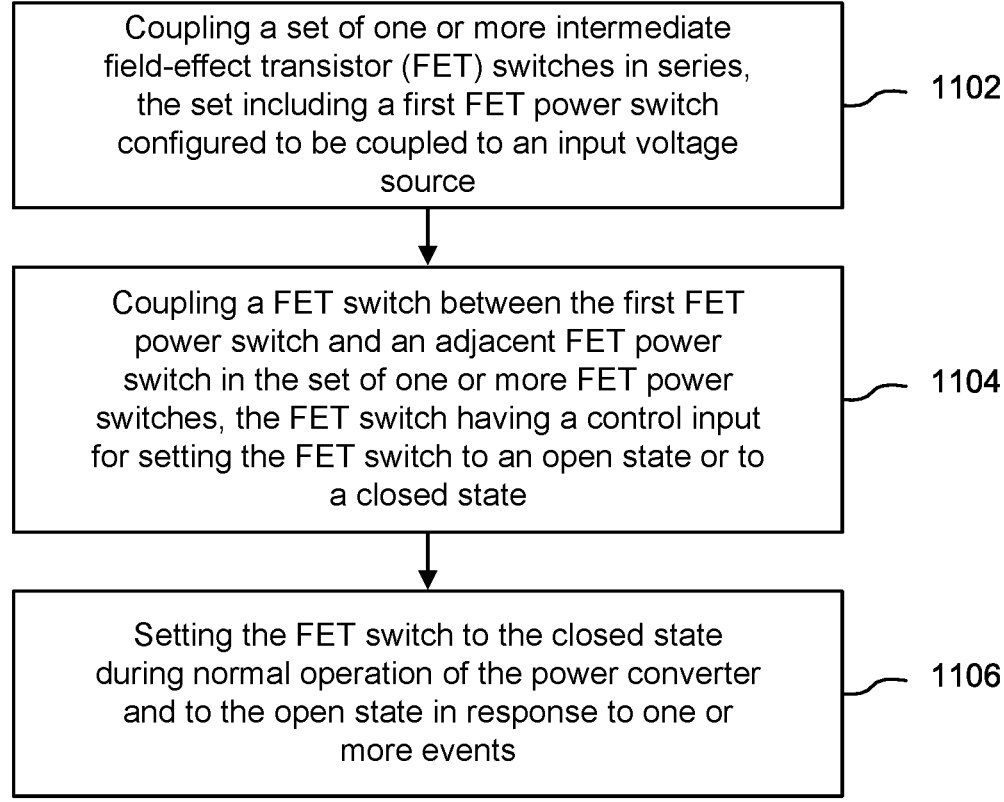
FIG. 11 is a process flow chart showing a fourth method for protecting a power converter.

As yet another example, FIG. 11 is a process flow chart 1100 showing a fourth method for protecting a power converter. The method includes: coupling a set of one or more intermediate field-effect transistor (FET) switches in series, the set including a first FET power switch configured to be coupled to an input voltage source (Block 1102); coupling a FET switch between the first FET power switch and an adjacent FET power switch in the set of one or more FET power switches, the FET switch having a control input for setting the FET switch to an open state or to a closed state (Block 1104); and setting the FET switch to the closed state during normal operation of the power converter and to the open state in response to one or more events (Block 1106).

Additional aspects of the above method may include one or more of the following: wherein at least one switch in the set of switches has a breakdown characteristic that is less than the breakdown characteristic of the switch; and/or wherein the events are transient events or fault events.

Additional Control and Operational Considerations

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main switches of the converter, the inherent body diode connected between the body and drain terminals of each MOSFET can also discharge the inductor current. Details of these solutions, as well as alternative shutdown solutions, are taught in U.S. Pat. No. 10,686,367, issued Jun. 16, 2020, entitled "Apparatus and Method for Efficient Shutdown of Adiabatic Charge Pumps", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "Startup Detection for Parallel Power Converters", assigned to the assignee of the present invention, the contents of which are incorporated by reference.

Another consideration in operating multi-level converter cells is attaining (i.e., pre-charging) and maintaining fly capacitor voltages that are essentially fully proportionally balanced so that all switches are subjected to a similar voltage stress, since unbalanced fly capacitors can lead to breakdown of a switch (particularly FET switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main switch that is part of a multi-level converter cell (in some cases, one switch-resistor pair may span two series-connected switches). This particular solution for pre-charging and/or balancing charge on fly capacitors is very fast, provides slow pre-charging of the fly capacitors during a pre-charge period, protects switches from in-rush current, and provides stable voltages for converter cell switches. Details of this solution, as well as alternative pre-charging and charge balancing solutions, are taught in U.S. Pat. No. 10,720,843, issued Jul. 21, 2020, entitled "Multi-Level DC-DC Converter with Lossy Voltage Balancing", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "Multi-Level DC-DC Converter with Lossless Voltage Balancing", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "Multi-Level DC-DC Converter with Boundary Transition Control", assigned to the assignee of the present invention, the contents of which are incorporated by reference.

Yet another consideration for some embodiments is protection of the main power switches and other components within a power converter from stress conditions, particular from voltages that exceed the breakdown voltage of such switches (particularly FET switches). One means for protecting a multi-level power converter uses at least one high-voltage FET switch while allowing all or most other main power switches to be low-voltage FET switches.

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

As should be clear, the multi-level power converter embodiments described in this disclosure may be synergistically combined with the teachings of one or more of the additional control and operational circuits and methods described in this section.

General Benefits and Advantages of Multi-Level Power Converters

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:

adaptability to applications in which input and/or output voltages may have a wide dynamic-range (e.g., varying battery input voltage levels, varying output voltages);

efficiency improvements on the run-time of devices operating on portable electrical energy sources (batteries, generators or fuel cells using liquid or gaseous fuels, solar cells, etc.);

efficiency improvements where efficiency is important for thermal management, particularly to protect other components (e.g., displays, nearby ICs) from excessive heat;

enabling design optimizations for power efficiency, power density, and form-factor of the power converter—for example, smaller-size multi-level power converters may allow placing power converters in close proximity to loads, thus increasing efficiency, and/or to lower an overall bill of materials;

the ability to take advantage of the performance of smaller, low voltage transistors;

adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);

adaptability to applications in which loads may vary widely, such as ICs in general (including microprocessors and memory ICs), electrical motors and actuators, transducers, sensors, and displays (e.g., LCDs and LEDs of all types);

the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), as well as other radio communication standards and protocols.

Fabrication Technologies & Options

While embodiments of the invention have been described in the context of a switched-capacitor network, the invention is also applicable to charge pumps and inductor-based regulators.

Note that the top FET protective switches and the bottom FET protective switches in FIGS. 5 and 6 can be "mixed and matched". Thus, for example, the combination of the bottom FET protective switch 504 in FIG. 5 and the top FET protective switch 602 in FIG. 6 may be used to provide protection for the power switches $Sw_X$ in a power converter. Similarly, the combination of the top FET protective switch 502 in FIG. 5 and the bottom FET protective switch 604 in FIG. 6 may be used to provide protection for the power switches $Sw_X$ in a power converter.

Note also that for some applications the bottom protective switch need not be a high-voltage switch if startup algorithms are used that prevent the top switch from fully turning ON until it is safe to do so. For example, charging circuits may be included that will charge the fly capacitors until it is safe to turn on the top FET protective switch.

While a 4-level multi-level converter circuit is shown in the examples described above, the present invention may be used in conjunction with any level of multi-level converter circuit (e.g., 3-level, 5-level, etc.) having a stacked-switch and parallel fly capacitor structure similar to the circuits of FIGS. 3, 4, 5, and 6, and may be adapted for use with power converters that use stacked switches which all reference a high voltage (e.g., $V_{IN}$) at one point in time and a low voltage (e.g., a reference voltage such as circuit ground) at another point in time.

In various embodiments of multi-level power converters, it may be beneficial to use specific types of capacitors, particularly for the fly capacitors. For example, it is generally useful for such capacitors to have low equivalent series resistance (ESR), low DC bias degradation, high capacitance, and small volume. Low ESR is especially important for multi-level power converters that incorporate additional switches and fly capacitors to increase the number of voltage levels. Selection of a particular capacitor should be made after consideration of specifications for power level, efficiency, size, etc. Various types of capacitor technologies may be used, including ceramic (including multi-layer ceramic capacitors), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide ($HFO_2$), or aluminum oxide $Al_2O_3$. In addition, multi-level power converter designs may beneficially utilize intrinsic parasitic capacitances (e.g., intrinsic to the power FETs) in conjunction with or in lieu of designed capacitors to reduce circuit size and/or increase circuit performance. Selection of capacitors for multi-level power converters may also take into account such factors as capacitor component variations, reduced effective capacitance with DC bias, and ceramic capacitor temperature coefficients (minimum and maximum temperature operating limits, and capacitance variation with temperature).

Similarly, in various embodiments of multi-level power converters, it may be beneficial to use specific types of inductors. For example, it is generally useful for the inductors to have low DC equivalent resistance, high inductance, and small volume.

The controller(s) used to control startup and operation of a multi-level power converter may be implemented as a microprocessor, a microcontroller, a digital signal processor (DSP), register-transfer level (RTL) circuitry, and/or combinatorial logic.

While the embodiments described above need no more than two high-voltage FETs, in alternative embodiments, one or more of the power switches $Sw_X$ described above as low-voltage FETs may instead be implemented as high-voltage FETs as may be needed in particular applications.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. References to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. Monolithic IC implementation is particularly useful since parasitic capacitances and inductances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A power converter, including:
   (a) a first switch having a control input for setting the first switch to an open state or to a closed state;
   (b) a second switch having a control input for setting the first switch to an open state or to a closed state; and
   (c) a set of one or more switches coupled in series, the set being coupled in series between the first switch and the second switch;
   wherein the first switch and the second switch are set to the closed state during normal operation of the power converter, and at least one of the first switch and the second switch is set to the open state in response to one or more events.

2. The invention of claim 1, wherein the one or more events are transient events or fault events.

3. The invention of claim 1, wherein the power converter is a multi-level power converter.

4. The invention of claim 1, wherein the one or more switches are low-voltage FETs.

5. The invention of claim 1, wherein at least one of the first switch and the second switch is a FET switch.

6. The invention of claim 1, further including a first switch controller coupled to the control input of the first switch and a second switch controller coupled to the control input of the second switch, wherein at least one of the first switch controller and the second switch controller sets the associated coupled switch to the open state in response to the one or more events.

7. The invention of claim 6, wherein the one or more events are transient events or fault events.

8. The invention of claim 1, wherein the first switch is an N-type FET and the second switch is a P-type FET.

9. A power converter, including:
   (a) a first switch having a control input for setting the first switch to an open state or to a closed state;
   (b) a second switch having a control input for setting the first switch to an open state or to a closed state; and
   (c) a set of one or more switches coupled in series, the set being coupled in series between the first switch and the second switch;
   wherein the first switch and the second switch are set to the closed state during normal operation of the power converter, and at least one of the first switch and the second switch is set to the open state in response to one or more events, and
   wherein the first switch is a FET switch having a first breakdown characteristic and the second switch is a FET switch having a second breakdown characteristic, and the one or more switches have a breakdown characteristic that is less than the first breakdown characteristic and the second breakdown characteristic.

10. A power converter, including:
    (a) a first switch having a control input for setting the first switch to an open state or to a closed state;
    (b) a second switch having a control input for setting the first switch to an open state or to a closed state;
    (c) a set of one or more switches coupled in series, the set being coupled in series between the first switch and the second switch; and
    (d) a first auxiliary protection circuit coupled between the control input of the first switch and a source of a subsequent adjacent switch within the set of one or more switches, and a second auxiliary protection circuit coupled between the control input of the second switch and a drain of a preceding adjacent switch within the set of one or more FET power switches;
    wherein the first switch and the second switch are set to the closed state during normal operation of the power converter, and at least one of the first switch and the second switch is set to the open state in response to one or more events.

11. The invention of claim 10, wherein the first and second auxiliary protection circuits comprise Zener diodes having a Zener voltage that is sufficient to prevent damage to the respective first or second adjacent power switch.

* * * * *